United States Patent [19]
Hickman

[11] 4,291,869
[45] * Sep. 29, 1981

[54] WORKBENCH

[75] Inventor: Ronald P. Hickman, Waltham Abbey, England

[73] Assignee: Tekron Licensing B.V., De Leersum, Netherlands

[*] Notice: The portion of the term of this patent subsequent to Jul. 3, 1996, has been disclaimed.

[21] Appl. No.: 19,753

[22] Filed: Mar. 12, 1979

Related U.S. Application Data

[60] Division of Ser. No. 781,841, Mar. 28, 1977, Pat. No. 4,159,821, which is a division of Ser. No. 642,742, Dec. 22, 1975, abandoned, which is a continuation of Ser. No. 511,017, Oct. 1, 1974, abandoned, which is a continuation of Ser. No. 277,118, Aug. 1, 1972, abandoned.

[30] Foreign Application Priority Data

Aug. 2, 1971 [GB] United Kingdom .............. 36269/71
Nov. 22, 1971 [GB] United Kingdom .............. 54165/71

[51] Int. Cl.³ .......................... A47B 3/08; B25B 1/10; B25B 1/24
[52] U.S. Cl. .................................. 269/139; 269/244; 269/261; 269/266; 269/901
[58] Field of Search .................. 269/139, 219–220, 269/244, 258–266, 279–284, 309, 321 CF, 901; 144/285–288; 108/91, 99, 117, 121; 182/182, 155, 152, 141; 298/439

[56] References Cited

U.S. PATENT DOCUMENTS

| | | | |
|---|---|---|---|
| 893,875 | 7/1908 | Schneider | 269/321 N |
| 1,328,492 | 1/1920 | Carman | 144/12 |
| 2,402,324 | 6/1946 | Grazier | 269/258 |
| 3,006,226 | 10/1961 | Poysa | 269/272 |
| 3,615,087 | 10/1971 | Hickman | 269/139 |
| 4,159,821 | 7/1979 | Hickman | 269/139 |

FOREIGN PATENT DOCUMENTS 1287657 11/1962 France .
691444 2/1969 South Africa .

*Primary Examiner*—Robert C. Watson
*Attorney, Agent, or Firm*—Brumbaugh, Graves, Donohue & Raymond

[57] ABSTRACT

A workbench of a collapsible nature includes a top structure comprising a pair of vice members. These can either be spaced from a supporting surface in a first work-mode at saw-horse height or, by lowering of legs, in a second work-mode at full height.

Each vise member is provided with two rows of cylindrical bores in which the shank portions of abutment members are axially and slidably received with a snug fit and are thereafter rotatable about a vertical axis to enable the gripping faces of the abutment members to self-align with a workpiece clamped between the abutment members.

10 Claims, 11 Drawing Figures

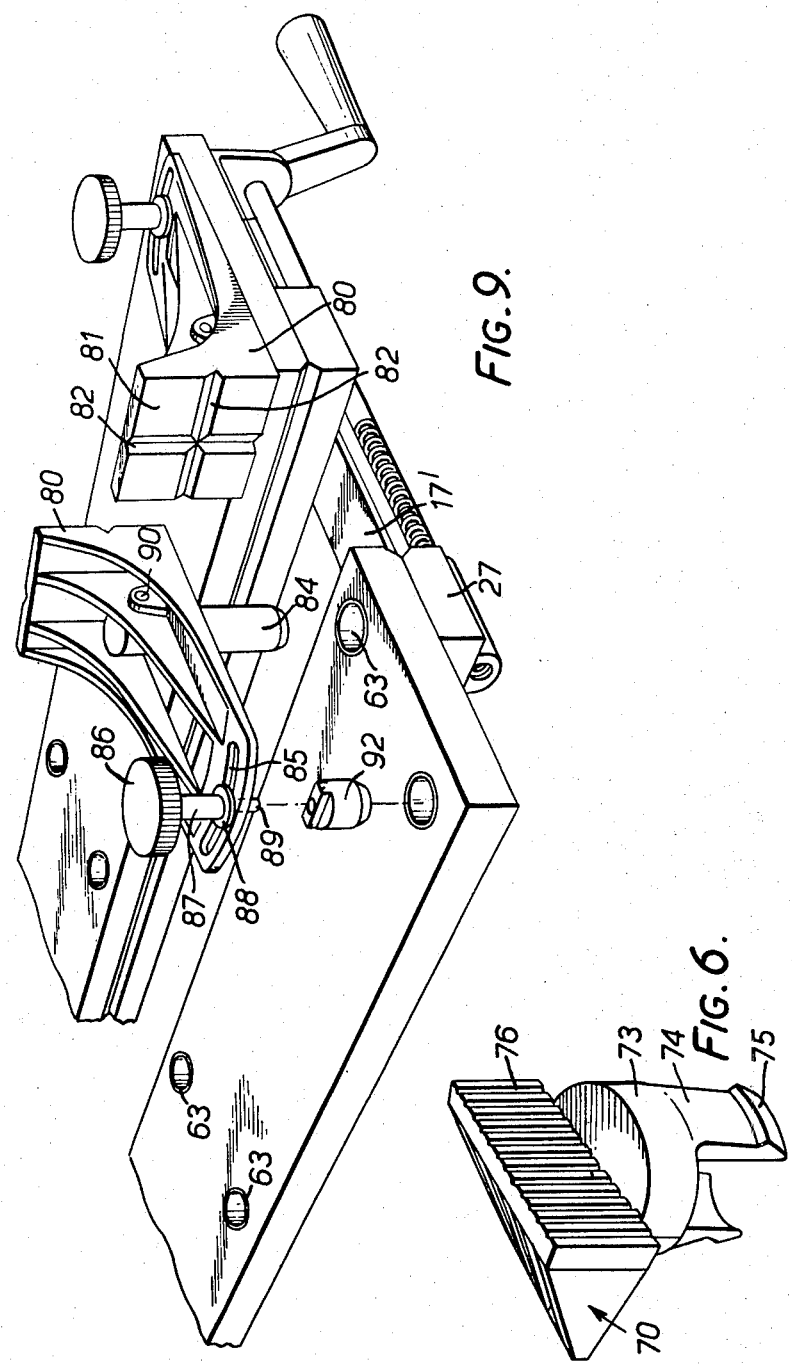

WORKBENCH

This is a divisional of application Ser. No. 781,841, filed Mar. 28, 1977 now U.S. Pat. No. 4,159,821, which was a division of application Ser. No. 642,742, filed Dec. 22, 1975, now abandoned, which was a continuation of application Ser. No. 511,017, filed Oct. 1, 1974, now abandoned which in turn was a continuation of application Ser. No. 277,118, filed Aug. 1, 1972, now abandoned.

THE FIELD OF THE INVENTION

This invention relates to workbenches and is concerned particularly with providing a dual purpose form of workbench whereby the working surface of the bench can be maintained in a rigid condition at alternative levels.

SUMMARY OF THE INVENTION

According to the present invention a workbench comprises top, intermediate and lower structures, a collapsible supporting structure adapted to maintain the top and intermediate structures in a first work-mode condition with the intermediate structure acting as a floor level base, and the lower structure being adapted to maintain both the top and intermediate structures spaced above the floor in an alternative second work-mode condition.

Preferably the supporting structure comprises at least one frame having its upper and lower ends pivoted respectively to the top and intermediate structures such that in a collapsed condition the top structure is juxtaposed the intermediate structure for storage or transportation.

The lower structure may include one or more legs which can either be detached to obtain the first work-mode condition or be pivoted to the intermediate structure for movement between storage and operative positions.

According to a further specific aspect of the present invention the floor contact area of the lower structure in the second work-mode is substantially greater than the floor contact area of the intermediate structure in the first work-mode. The term "floor contact area" in this context means in either case the floor area encompassed by a perimeter line drawn around the outermost points of floor contact. This aspect ensures that, as the workbench is converted from its first work-mode, to its second work-mode, so increasing its height, the contact area between the workbench as a whole and the floor is substantially increased in order to give it corresponding stability.

The top structure may comprise a bearing structure, bearing a pair of top members forming a vice and having upper surfaces lying in substantially the same plane, at least one of the top members being movable with respect to the other to cause opposed substantially vertical faces thereof to be moved relatively towards and away from one another, said movement being caused by actuation of one or both of a pair of spaced clamping devices which are capable of independent operation to permit the gap between the vertical faces to be greater at one end than at the other.

The intermediate structure may incorporate a pair of spaced side frames disposed substantially parallel to one another and having opposed surfaces between which the collapsible supporting structure is pivoted, a platform extending between the side frames adjacent their forward ends, the lower structure including a pair of rear legs connected at their upper ends by a transverse upper section pivoted at its ends to each of said opposed surfaces, about an axis at right angles to the side frames and two front legs one pivoted to each of the side frames about axes extending parallel to the side frames. The rear legs may be formed as two limbs depending, one at each end, from a laterally extending rear cross member connecting their upper ends, with each adapted to contact the floor at a region rearward of the rear end of the adjacent side frame.

DESCRIPTION OF THE DRAWINGS

FIG. 5 is a diagram illustrating certain advantages of the present invention;

FIG. 6 is a form of plug-in swivelling stop for use with the work bench;

FIG. 9 shows the form of a metal-worker's vice and its mode of attachment to the work bench;

DESCRIPTION OF THE PREFERRED EMBODIMENT

Figure 1:
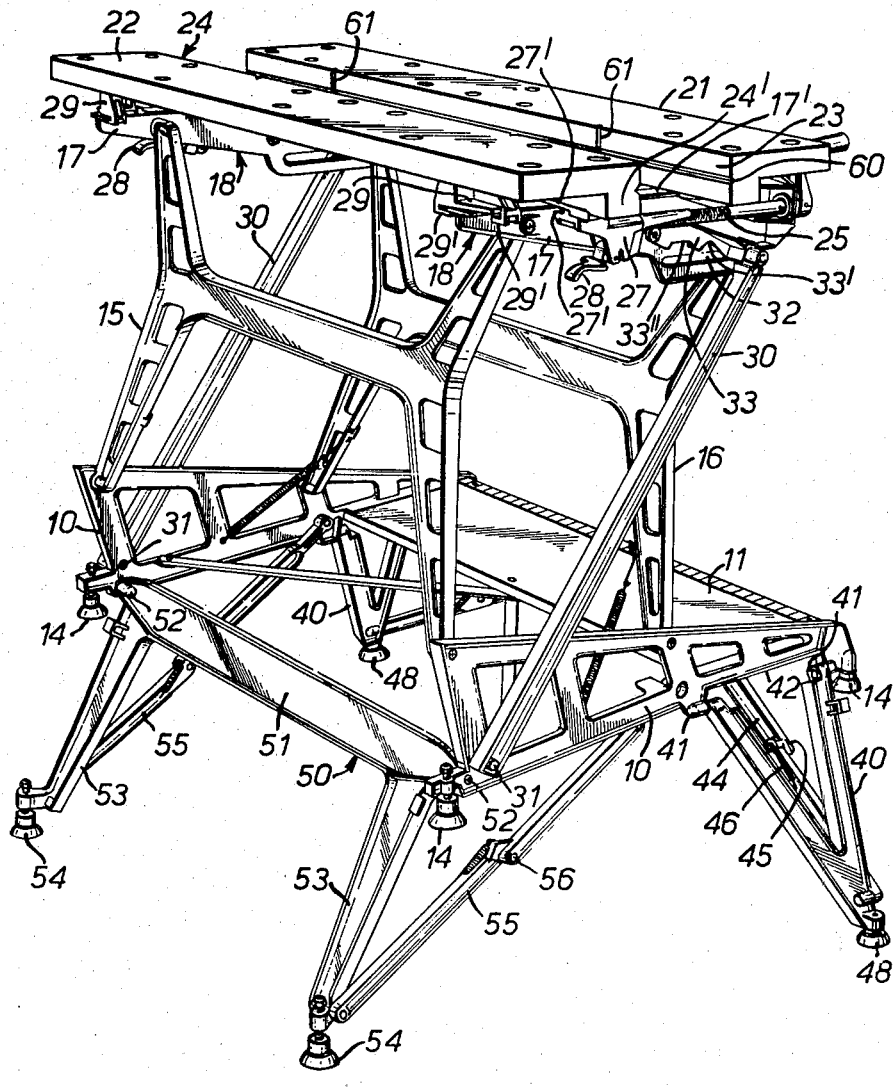
FIG. 1 illustrates a collapsible work bench according to the present invention, the bench being shown in a high work-mode condition.
Figure 2:
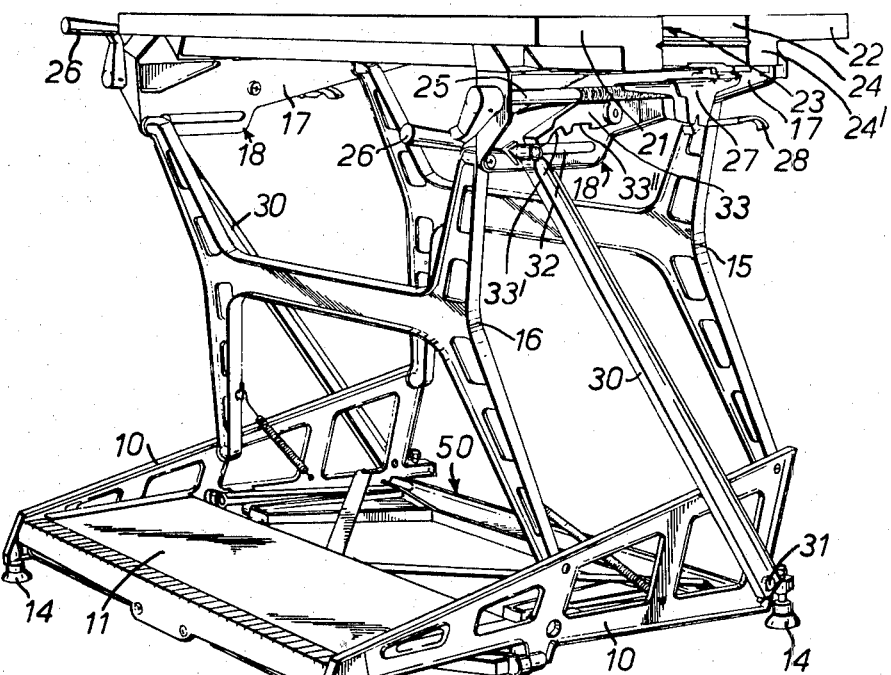
FIG. 2 illustrates the work bench of FIG. 1 in a low work-mode condition.

Referring firstly to FIG. 1 this discloses a pair of lateral frames 10 which, together with a base board 11, provide what can be termed as "an intermediate structure" but which for a first work-mode condition of the bench, shown in FIG. 2, provides a base adapted to rest on the floor by means of four adjustable feet 14. Pivotally connected to the frames 10 are a pair of H-shaped frames 15 and 16 formed as castings, the upper ends of which are pivotally connected to vertical webs 17 of two generally T-shaped side members 18, horizontal webs 17' of which carry the top structure of the work bench.

This top structure incorporates a pair of spaced laminated timber beams 21 and 22 of inverted L-section and having their horizontal surfaces aligned in the same plane. The beams have opposed vertical surfaces 23 and 24, respectively, which form a vice. It will be observed that the beams have thickened or deeper portions 24' adjacent their faces 23 and 24. The front beam 23 is secured rigidly to the side members 18 whilst the rear beam 22 can be moved towards and away from the beam 23 by means of a pair of clamping screws 25 each of which has a cranking handle 26. The rear end of each screw 25 engages in a nut member 27 secured to the underside of the thickened portion 24' of the rear beam 22 by means of single vertical pivotal connection which permits angular operation of these clamping devices substantially as described in U.S. Pat. No. 3,615,087.

The devices are so arranged that one can operate independently of the other in order that the faces 23 and 24 can be clamped up in an angular manner to grip differently shaped work pieces. Each nut member 27 incorporates a quick release lever 28 at its rear end and also has a pair of horizontal flanges 27' which engage one under and one over the horizontal web 17' of the adjacent side member 18. The rear beam 22, adjacent its rear underside carries two guide members 29 arranged to co-operate one with each of the side members 18. For this purpose each guide member 29 rests on the horizontal web 17' but has a pair of opposed horizontal flanges 29' which extend under the web 17' to prevent upward movement of the beam 22 away from the side member 18 and yet permit limited displacement as is required during angular clamping operations.

In FIG. 2 the work bench is maintained in its first work-mode condition by means of a pair of diagonal braces 30 pivoted at their lower ends by pivotal connections 31 to the respective frame 10. Each brace is connected loosely at its upper end to a slot 32 in the adjacent web 17 and retained at the front end of the slot by means of a pivoted latch 33. The latch is sprung biassed downwards to the latched position of FIGS. 1 and 2 in which the end of the latch obstructs rearward movement of the upper end of the brace 30. Each latch has a pair of notches 33' and 33" the first of which acts as a secondary catch in the upright open condition of the bench and the second of which engages the upper end of the brace 30 in the collapsed condition of the top structure to prevent it falling open during transportation. The latch thus serves a dual function. When it is desired to collapse the work bench in order to bring the top structure in close juxtaposition to the base structure, the latch 33 is lifted and the two frames 15 and 16 can then be collapsed one upon the other.

In FIGS. 1 and 2 three leg structures are shown which form the means by which the work bench is maintained in its second work-mode condition. The leg structures include a pair of V-shaped front legs 40, the upper ends of which are pivoted about horizontal axes 41 to cut out regions 42 of the frames 10. Each leg 40 has a brace 44 formed in two halves pivoted together at 45 and also interconnected by a spring 46 which maintains the two halves in an 'over-centre' condition in FIG. 1 and also, when the legs are pivoted upwardly beneath the base board 11 as shown in FIG. 2, maintains the legs in their retracted position beneath the base board. Each leg 40 carries a rubber foot 48.

A single rear leg 50 is included which is of generally inverted U-shape having a horizontal limb 51 extending between pivots 52 at the rear corners of the two frames 10 and downwardly extending limbs 53 each carrying a further, adjustable, foot 54. Extending upwardly from the lower end of each arm 53 is a brace 55, similar to the brace 44, and again formed in two sprung sections hinged at 56.

Figure 3:
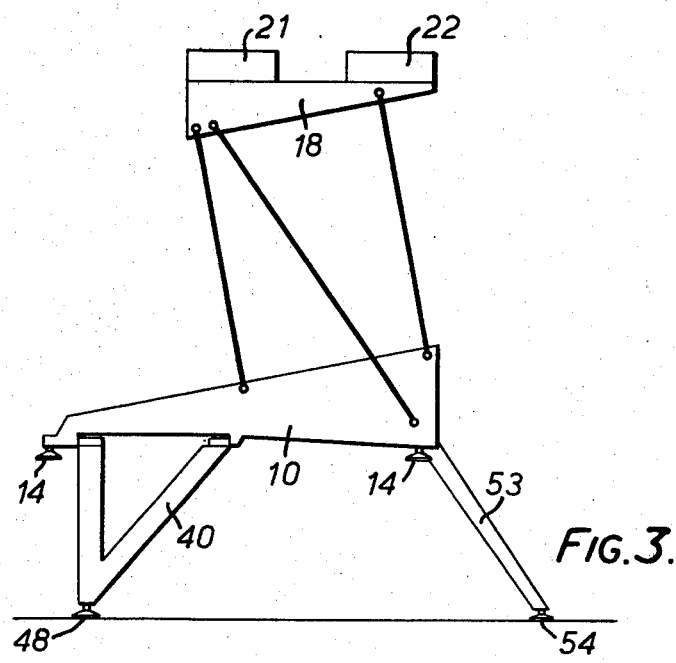
FIG. 3 is a diagrammatic side elevation of the work bench of FIG. 1.
Figure 4:
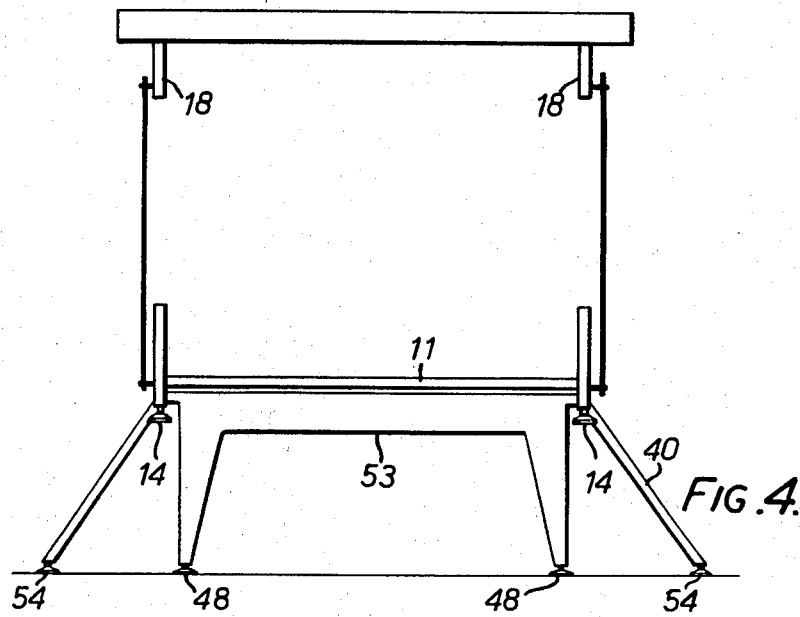
FIG. 4 is a diagrammatic front elevation of the work bench of FIG. 1.

It is to be particularly noted, for example with reference to FIGS. 3 and 4, that the floor plan area embraced by the four adjustable feet 14 in the first work-mode condition is substantially increased when the legs 40 and 53 are lowered since the floor area embraced by the two forward feet 48 and the two rearward feet 54 is substantially greater than the area embraced by the feet 14. In this manner the weight of the work bench as a whole is distributed over a considerably greater area than in its first work-mode condition. This provides the work bench with corresponding stability as its height is increased. Whilst, in the particular configuration shown, all four supporting corners of the bench are moved outwards as the height is increased, it might in some instances suffice for, say, only the front feet to be splayed out in the higher mode.

Increased stability could also be obtained by providing the bench with a further base-board of considerable area for the second work-mode condition, and to which the bench could be releasably fixed.

The construction of work bench so far described is very versatile. It can be used in its first work-mode condition of FIG. 2, for example with the upper surfaces of the beams 21 and 22 at normal saw-horse height. This is very convenient for many operations. If, however, a full work bench height is required, the retractable legs can be lowered to produce the second work-mode condition of FIG. 1 in which the height of the work bench is for example 32 inches.

The bench as a whole has two stages of collapse from the FIG. 1 condition. On the other hand the top structure can be pivoted with respect to the frames 10 to the dotted line position shown in FIG. 5, and secondly, the retractable legs 40 and 53 can be retracted beneath the base board 10, as shown in FIG. 2. FIG. 5, for comparison purposes, also shows a construction, *not* according to the invention.

Thus if as shown in full lines in FIG. 5, the legs 40 and 53 are omitted, and the frames 15', 16' and the braces 30' are appropriately lengthened, with the frames 10 remaining at floor level, the fully collapsed condition of the bench is as shown in chain-dotted lines. In such a case the collapsed dimension 'x', of the construction according to the invention is increased to 'y' which is very little less than the full height of the bench and would provide a cumbersome construction. Therefore, the two stages of collapse according to the invention provide for considerable economy in space and ease of handling. The collapsed structure, according to the invention, is extremely light and can be readily carried in one hand. This would not be possible with a construction such as that of the full line arrangement of FIG. 5. Furthermore, FIG. 5 illustrates a further advantage of the present invention in that, in the FIG. 5 construction, the front to back depth 'z' (nor the lateral width) of the base is not altered for the high work-mode condition and, as a consequence, the construction of FIG. 5 would be relatively unstable as compared with that of FIG. 1.

The provision of a pair of front legs 40 having pivotal axes which are at right angles to the pivotal axis of the rear leg 53 provides for considerable stability in the second work-mode since the two front legs 40 are ideally positioned to take loads from left to right, as the work bench is viewed from the front, whilst the three legs, namely the two front legs 40 and the rear leg 53, can also readily accommodate forward and rearward loads.

The opposed surfaces 23 and 24 of the beams 21 and 22 respectively are each provided with a longitudinal "V" groove 60 and a pair of vertical "V" grooves 61 to enable work pieces which are not flat, e.g., tubes or the like, to be securely held by the vice either in a horizontal or a vertical manner.

Each of the beams 21 and 22 is provided with two parallel rows of vertically extending circular holes 63 which extend the full depth of the beams. The precise number and arrangement of holes 63 can vary according to requirements, but one arrangement is shown in FIG. 1, a second in FIGS. 7 and 8 and a third in FIGS. 9, 10 and 11. Each beam may also be provided with one or more horizontal holes of limited depth in each of its end faces. Where the beams 21 and 22 are formed of wood (e.g. laminated wood) the holes 63 are preferably provided with metal linings, e.g. of steel or aluminium.

The purpose of the holes 63 and 64 is to enable the two beams 21 and 22 to be used either alone or together for a variety of purposes, many of which incorporate a cramping or stretching action which can be obtained by use of one or both of the clamping screws 25.

FIG. 6 shows one form of swivel type stop attachment 70 which can be plugged into any one of the holes 63 as desired. For this purpose the stop 70 may be formed from nylon having a cylindrical plug-in section 73 and two depending flexible lugs 74 each of which is provided with a rib 75. Surmounting the plug-in section 73 is a stop section 76 having a vertical face provided with a number of vertical ribs.

Figure 7:
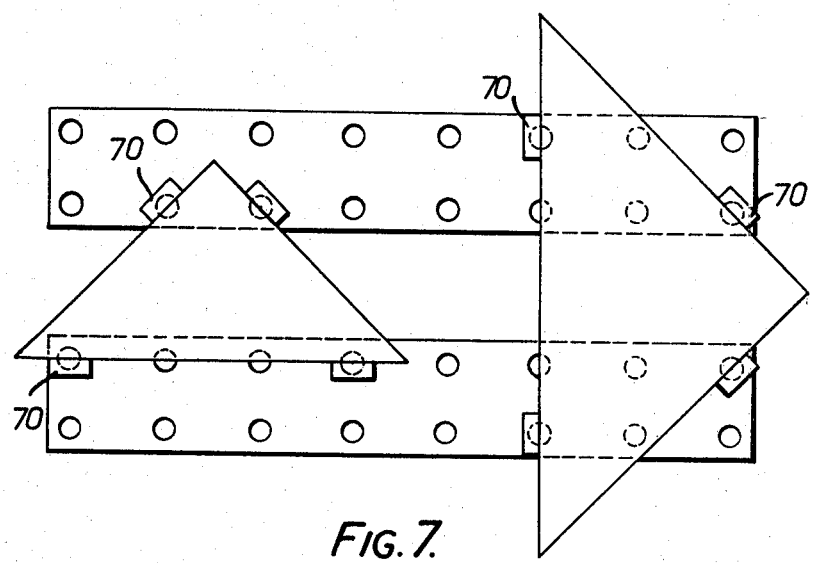
FIGS. 7 and 8 illustrate diagrammatically the manner in which work pieces may be secured to the vice members by use of a number of stops of the type shown in FIG. 6.
Figure 8:
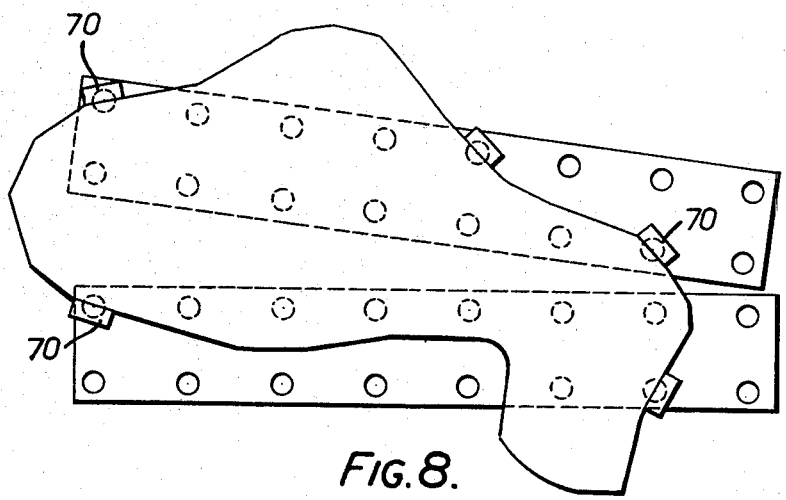

In practice a considerable number of the stops of the form shown in FIG. 6 can be employed at any one time depending upon the work piece intended to be held by the work bench. When not required they can be stored by insertion from below into the holes 63 adjacent the vice faces. FIGS. 7 and 8 illustrate the manner in which regular or irregular shaped work pieces can be clamped up by using a number of the stops of the type shown in FIG. 6. Each stop is capable of turning automatically about a vertical axis within a hole 63 in the top of the bench in order to adopt the desired alignment with respect to the work piece. It will be apparent from FIGS. 6 and 7 that in some cases the beams of the work bench will be clamped up in a parallel manner and in other cases in an angular manner.

It is to be understood that the form of stop illustrated in the drawings could be associated in some cases with a work bench having a vice top in which the beams are only capable of parallel adjustment. Whilst in some cases this would restrict the scope of use of the stops there will be many cases in which parallel vice adjustment is adequate for the swivelling stops to be positioned correctly for holding regular and irregular shaped work pieces. It is to be noted from FIGS. 6 and 7 that in some cases the swivelling type stops are located in holes of the outer row of a vice beam and in other cases in holes of an inner row.

The stops can also be used in association with the work bench without using the vice top facility of the work bench. For example a pair of stops may be located in holes in a single beam of the bench in effect to provide a form of "bench hook" during the sawing of a plank. At this time the beams of the bench may be drawn up as required in order to permit the plank to rest across the gap between the beams and, of course, the beams could, if desired, be drawn up right against one another.

FIG. 9 illustrates the detail of the form of a two-part metal-worker's vice capable of attachement to the work bench. Each part includes a casting 80, the forward face 81 of which is formed with two intersecting "V" shaped grooves 82. Just to the rear of the face 81 the casting 80 has a steel pin 84 which can be located in one of the holes 63 in one of the beams of the vice. This will generally be in one of the holes adjacent the vice face. The pin 84 is pivoted to the casting 80 by a horizontal pivot pin 90. The casting has, spaced from the steel pin 84, an arcuate slot 85 which receives a clamping member comprising a knob 86 secured to the upper end of a rod 87 which carries an integral flange 88, and has a lower, reduced diameter threaded portion 89. The portion 89 engages in a threaded bore of a peg 92 which engages in another of the holes 63 in the beam of the vice. The peg 92 is thus located beneath the casting 80 but can be clamped in any desired position with respect to the arcuate slot 85 by means of the knob 86. In this way, once the pin 84 and peg 92 are located in two adjacent holes of a vice beam the vertical face 81 of the metalworker's vice can be manually moved about the vertical axis of the pin 84 to a desired position in which it can be clamped. Alternatively, when not clamped, the vice parts 80 can be caused to rotate by a work piece of an irregular shape as it is clamped up by clamping devices 25. When clamping up takes place, there is a tendency for the pin 84 to be tilted. This causes it to bind in the aperture 63 so as to prevent upward withdrawal, but does not prevent swivelling if required.

Figure 10:
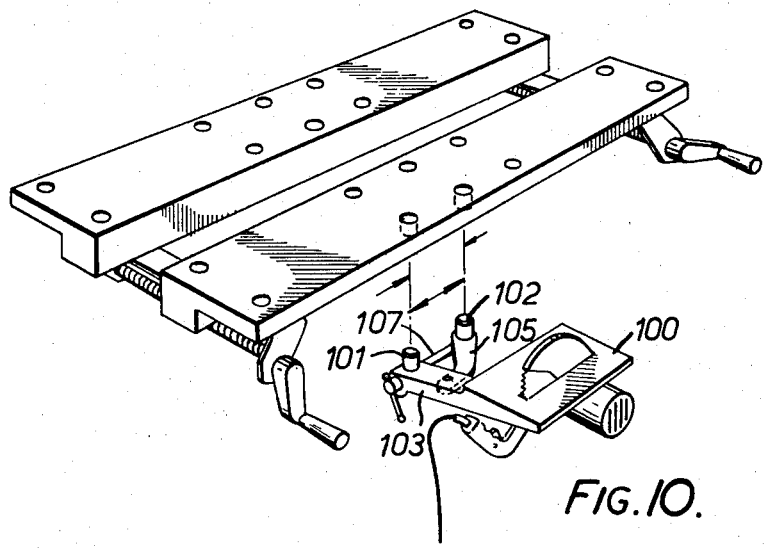
FIG. 10 illustrates the attachment of a saw-table to the work bench.
Figure 11:
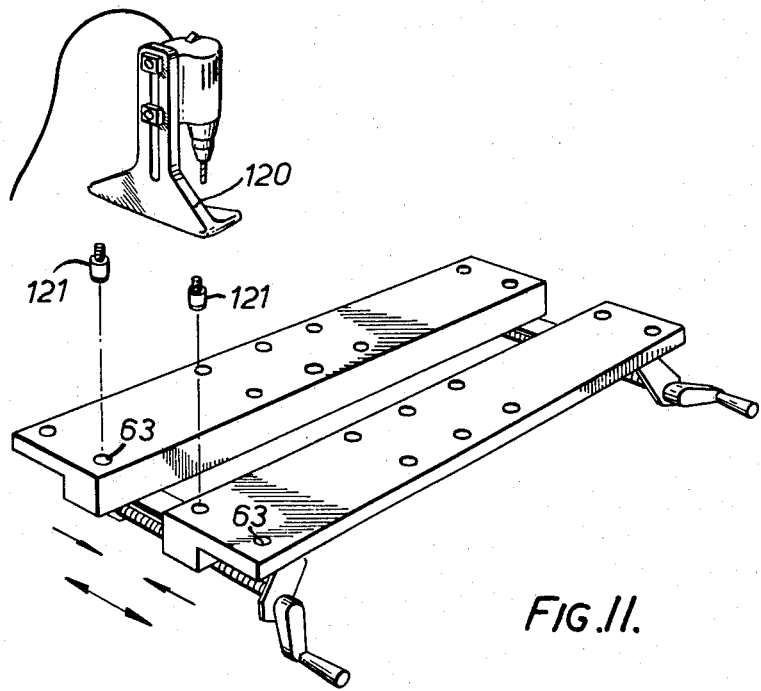
FIG. 11 illustrates the attachment of a drill to the work bench.

Whilst all embodiments so far described envisage the use of pegs or the like which extend into the upper ends of the holes 63, this is by no means essential. The holes can extend completely through the vice beams and can permit tools to be secured by means of pegs extending into the holes from below, for example, as indicated in FIG. 10 which shows the manner in which a saw table 100 can be mounted with respect to one of the beams by means of a pair of upwardly extending pegs 101 and 102. The peg 101 is connected to a rigid part 103 carried by the saw table. The other peg 102 is mounted on a pivoted arm 105 which is interconnected with the rigid part 103 by means of screw threaded rod 107 in order to move the two pegs 101 and 102 towards or away from one another to secure the device rigidly to a single vice beam. Incidentally, this leaves the vice structure still available for use.

FIG. 9 illustrates diagrammatically the manner in which a tool such as a drill-stand 120 (which may be a standard item) can be rigidly connected to the vice structure by means of a pair of downwardly extending adaptor pegs 121 arranged to be screwed into the underside of the drill-stand and to extend one into each of the forward rows of holes 63 in the two vice beams. Thereafter the vice beams can be either drawn apart or clamped together as indicated by the arrows to the desired extent to hold the pegs 121 firmly in position.

It should be stressed that whilst all the constructions so far described and shown include vice structures which have substantially vertical faces capable of use as a vice by themselves, where a structure is intended only to be used to support or locate tools or work pieces by means of the apertures in the horizontal surfaces of the beams, the vertical faces are not actually required and need not, therefore, be included.

A further application of this vice structure is for use in forming shaped articles. For example a pair of curved jigs could be clamped one to each of the vice beams in order to provide any desired configuration for the forming of a laminated structure. Equally the clamping or tensioning action of the beams can be utilised not only for forming but for punching or cutting purposes by mounting the appropriate tools or formers on the vice beams.

Where desired the pegs or stops which are located in the holes of the vice beams can be of an expanding nature in order to provide for extremely rigid location, for example in the manner of a chuck. Alternatively, a keyhole type of location can be provided.

What I claim as my invention and desire to secure by Letters Patent is:

1. A portable combined workbench and sawhorse, comprising:

a worktop, including a unitary vise structure having a fixed jaw and a movable jaw, the upper surfaces of said jaws lying in substantially the same plane and defining the working surface of said worktop;

a collapsible supporting structure for the worktop, including means providing a first, lower position of the worktop facilitating a sawhorse mode of operation and a second, higher position of the worktop facilitating a workbench mode of operation;

clamping means operatively coupled between the fixed jaw and the movable jaw for moving the movable jaw relative to the fixed jaw in said plane to securely hold a workpiece therebetween;

each of said jaws having a plurality of apertures formed through the upper surface thereof;

a plurality of abutment members adapted to be positioned within selected ones of the apertures in the respective jaws, each abutment member including means defining at least one abutment face which is rotatable relative to the upper surface of the jaw;

the clamping means further including means for moving said movable jaw into a substantially non-parallel relationship with respect to said fixed jaw to facilitate the gripping between the abutment members of the respective jaws of an irregularly-shaped workpiece; and means for constraining said movable jaw against any substantial movement out of said plane during gripping of a workpiece, while permitting said movable jaw to be moved relative to said fixed jaw as aforesaid.

2. A portable workbench, comprising:

front and rear, laterally elongated vise members the upper surfaces of which are substantially co-planar and form a working surface;

means supporting said vise members for front-to-rear and angular movement relative to one another in the plane of the working surface while constraining said vise members against any substantial movement out of said plane during clamping of a workpiece therebetween;

means defining at least one row of at least two laterally-spaced cylindrical bores in the upper surfaces of each vise member;

a plurality of abutment members, each comprising a shank portion adapted to be rotatably received in one of said cylindrical bores and a workpiece-engaging surface adapted to project above the surface of the vise member;

a pair of laterally spaced-apart, hand-operable devices operatively coupled between said front and rear vise members for (1) moving said vise members relative to one another in the front-to-rear direction and (2) angularly displacing one vise member relative to the other vise member, whereby the rows of cylindrical bores in the respective vise members, and the associated abutment members, may be adjusted both in the front-to-rear direction and angularly relative to each other to facilitate the gripping therebetween of irregularly-shaped workpieces; and adjustable-height leg means for selectively supporting said working surface at different working heights above a floor, including at least a lower height corresponding to sawhorse height and a higher height corresponding to full workbench height.

3. A portable, collapsible workbench adapted to be carried by hand to a site of use by an individual and there erected in a free-standing manner, comprising:

a pair of vise members having (1) elongate clamping faces and (2) upper surfaces lying in substantially the same plane and defining a work surface;

means defining a plurality of substantially cylindrical bores opening through the upper surface of each vise member;

a plurality of abutment members, each having (1) a shank portion rotatably receivable in a cylindrical bore and (2) an abutment portion projecting above said shank portion, said abutment members being adapted to be snugly and rotatably received in the bores of said vise members with said abutment portion projecting above the work surface for engaging a workpiece;

vise operating means operatively connected to at least one of said vise members for selectively adjusting the angular position of said one vise member relative to the other vise member in the plane of said working surface, whereby the abutment member or members in said one vise member may be bodily moved angularly with respect to the abutment member or members in said other vise member so as to facilitate the gripping therebetween of irregularly-shaped workpieces;

means for constraining said vise members against any substantial tilting out of the plane of said work surface during the gripping of a workpiece, while permitting said angular movement of said one vise member in said plane;

leg means for, when erected, selectively supporting said work surface at a plurality of distinct working heights above a floor, including at least sawhorse height and full workbench height, said leg means being capable of being stored in a configuration which substantially reduces the overall vertical size of the workbench so as to permit an individual to carry it by hand.

4. The workbench of claim 3 wherein said bore defining means defines at least one row of at least two cylindrical bores in each vise member, said row extending generally parallel to the clamping face of the vise member, whereby the rows of bores may be angularly displaced relative to one another by operation of said vise operating means to facilitate the gripping between abutment members located in said rows of irregularly-shaped workpieces.

5. The workbench of claim 3 wherein said vise operating means comprises a pair of independently-operable screw threaded devices spaced apart in the direction of elongation of said clamping faces and means for coupling each of said devices to said one vise member for permitting angular movement of said one vise member relative to said each device in the plane of said working surface.

6. The workbench of claim 3 wherein the clamping face of at least one of said vise members includes one or both of a groove extending lengthwise thereof and a groove extending vertically thereof, to facilitate the gripping between said vise members of cone-shaped and rounded workpieces.

means for constraining said vise members against any substantial tilting out of the plane of said work surface during the gripping of a workpiece, while permitting said angular movement of said one at least one vise member in said plane; and collapsible leg means movable, when erected, between (1) a first, retracted position at which said work surface is supported at sawhorse height above the floor and (2) a second, extended position at which said work surface is supported at workbench height above the floor, said leg means being capable of being stored in a configuration which substantially reduces the overall vertical size of the workbench so as to permit an individual to carry it by hand.

7. A portable, collapsible workbench adapted to be carried by hand to a site of use by an individual and there erected in a free-standing manner, comprising:

a pair of vise members having (1) elongate clamping faces and (2) upper surfaces lying in substantially the same plane and defining a work surface;

means defining a plurality of substantially cylindrical bores opening through the upper surface of each vise member;

a plurality of abutment members, each having (1) a shank portion rotatably receivable in a cylindrical bore and (2) an abutment portion projecting above said shank portion, said abutment members being adapted to be snugly and rotatably received in the bores of said vise members with said abutment portion projecting above the work surface for engaging a workpiece;

vise operating means operatively connected to at least one of said vise members for selectively adjusting the angular position of said one vise member relative to the other vise member in the plane of said working surface, whereby the abutment member or members in said one vise member may be moved angularly with respect to the abutment member or members in said other vise member so as to facilitate the gripping therebetween of irregularly-shaped workpieces;

means for constraining said vise members against any substantial tilting out of the plane of said work surface during the gripping of a workpiece, while permitting said angular movement of said one at least one vise member in said plane; and collapsible leg means movable, when erected, between (1) a first, retracted position at which said work surface is supported at sawhorse height above the floor and (2) a second, extended position at which said work surface is supported at workbench height above the floor, said leg means being capable of being stored in a configuration which substantially reduces the overall vertical size of the workbench so as to permit an individual to carry it by hand.

8. A portable workbench, comprising:

a pair of elongated vise members having (1) facing edges and (2) upper surfaces lying in substantially the same plane to provide a working surface;

support structure for supporting said vise members;

means linking said vise members to said supporting structure for restraining upward movement of said vise members away from said support structure while permitting movement thereof in the plane of the working surface;

vise operating means for moving one of said vise members positively relatively toward and away from the other in a clamping direction and angularly relative to the other in the plane of the working surface to clamp a workpiece between the vise members, said vise operating means including two independently-operable vise operating devices spaced apart lengthwise along said vise members and drivably coupled to said one vise member for producing said relative movements;

each vise member having at least one row of at least three bores having axes perpendicular to said plane, said rows extending generally transversely of said clamping direction with said bores opening through the upper surface of each vise member, at least one of said vise members having an additional row of at least two upwardly opening bores having axes perpendicular to said plane, at least one of said two bores in said additional row being intermediate the two end bores in said first mentioned row therein;

a plurality of abutment members each having a shank portion adapted to be snugly and axially slidably receivable and thereafter capable of rotation, without axial movement, in said bores, and having an abutment portion adapted to project above said plane, said abutment portion presenting a workpiece-engaging surface extending generally upright from said plane, and collapsible leg means for selectively supporting said working surface at at least two distinct working heights over a floor, said leg means being collapsible in stages from (1) a fully erected position, at which it supports the working surface at full workbench height, to (2) an intermediate erected position, at which it supports the work surface at sawhorse height, to (3) a fully collapsed position, at which the workbench may be readily stored or transported.

9. A portable workbench, comprising:

front and rear, laterally elongate vise members having (1) elongate clamping edges and (2) upper surfaces which are substantially co-planar and form a working surface, each said vise member being generally L-shaped in transverse cross section, with the shorter leg of the L-shaped section extending downward and forming the clamping edge of said vise member;

means supporting said vise members for front-to-rear and angular movement of at least one vise member relative to the other in the plane of the working surface while constraining said vise members against any substantial movement out of said plane, said means including front-to-rear extending supporting surfaces underlying said one vise member and guide means interposed between said supporting surfaces and the longer leg of said one vise member for supporting said one vise member above said supporting surfaces for front-to-rear and angular movement relative thereto;

means defining at least one row of at least two laterally-spaced cylindrical bores in the upper surface of each vise member;

a plurality of abutment members, each comprising a shank portion rotatably receivable in one of said cylindrical bores and a workpiece-engaging surface projecting above said shank portion, said abutment members being adapted to be located in cylindrical bores of said vise members with said workpiece engaging surfaces projecting above the surfaces of the vise members; and a pair of laterally spaced-apart, hand-operable devices operatively coupled between said front and rear vise members for (1) moving said vise members relative to one another in the front-to-rear direction and (b 2) angularly displacing one vise member relative to the other vise member, whereby the rows of cylindrical bores in the respective vise members, and the associated abutment members, may be adjusted both in the front-to-rear direction and angularly relative to each other to facilitate the gripping therebetween of irregularly-shaped workpieces.

10. The workbench of claim 9 further comprising convertible support means for, in one position thereof, supporting said vise members above a floor in a free-standing manner and, in a second position thereof, permitting substantial reduction in the overall vertical height of the workbench to facilitate the storage and transport thereof.

* * * * *

UNITED STATES PATENT AND TRADEMARK OFFICE
CERTIFICATE OF CORRECTION

PATENT NO. : 4,291,869
DATED : September 29, 1981
INVENTOR(S) : Ronald P. Hickman It is certified that error appears in the above—identified patent and that said Letters Patent is hereby corrected as shown below:

```
Column 3, line 23, "sprung" should read --spring--;
Column 4, line 20, "other" should read --one--;
Column 5, line 58, "attachement" should read --attachment--;
Column 6, line 37, "Fig. 9" should read --Fig. 11--;
Column 8, delete lines 67 and 68;
Column 9, delete lines 1 - 13.
```

Signed and Sealed this

Sixteenth Day of February 1982

[SEAL]

Attest:

GERALD J. MOSSINGHOFF

*Attesting Officer*   *Commissioner of Patents and Trademarks*